United States Patent
Lee et al.

(10) Patent No.: US 7,126,990 B2
(45) Date of Patent: Oct. 24, 2006

(54) METHOD AND APPARATUS FOR CONTROLLING A STEREO VIDEO DISPLAY WITH NON-STEREO VIDEO SOURCE

(75) Inventors: Ruen-rone Lee, Hsin Chu (TW); Chung-yen Lu, Taipei (TW)

(73) Assignee: Silicon Integrated Systems Corp.(TW)

( * ) Notice: Subject to any disclaimer, the term of this patent is extended or adjusted under 35 U.S.C. 154(b) by 796 days.

(21) Appl. No.: 10/290,932

(22) Filed: Nov. 7, 2002

(65) Prior Publication Data
US 2003/0179289 A1 Sep. 25, 2003

(30) Foreign Application Priority Data
Mar. 25, 2002 (TW) ................ 91105840 A

(51) Int. Cl.
H04N 7/12 (2006.01)
H04B 1/66 (2006.01)
(52) U.S. Cl. ................................. 375/240.16
(58) Field of Classification Search ..................... None
See application file for complete search history.

(56) References Cited

U.S. PATENT DOCUMENTS

| | | | |
|---|---|---|---|
| 5,495,576 A * | 2/1996 | Ritchey ....................... | 345/420 |
| 5,619,256 A * | 4/1997 | Haskell et al. ................. | 348/43 |
| 5,896,116 A * | 4/1999 | Torizuka et al. ............... | 345/87 |
| 5,907,704 A * | 5/1999 | Gudmundson et al. ..... | 717/100 |
| 6,625,310 B1 * | 9/2003 | Lipton et al. ................ | 382/173 |
| 6,919,892 B1 * | 7/2005 | Cheiky et al. .............. | 345/473 |

FOREIGN PATENT DOCUMENTS

WO    WO 98/29860    9/1998

* cited by examiner

*Primary Examiner*—Nhon Diep
(74) *Attorney, Agent, or Firm*—Martine Penilla & Gencarella, LLP

(57) ABSTRACT

An apparatus for controlling a stereo video display with non-stereo video source includes a memory, a read/write controller and a motion analyzer. The memory stores a current frame, a previous frame of the current frame, and a next frame for the current frame that is in preparation. The current frame and the previous frame are for a dextral image and a sinistral image of a stereoscopic image respectively. The read/write controller controls the addresses to write the current frame and the next frame into the memory, and the reading order of the current frame and the previous frame. The motion analyzer calculates an overall motion direction of the next frame in relation to the current frame, and compares the next overall motion direction to a previous overall motion direction of the current frame in relation to the previous frame, to control the action of the read/write controller to read from or write into the memory, so that when the horizontal relation between the next overall motion direction and the previous overall motion direction is changed, the corresponding relation between the current and the next frames and the dextral and the sinistral images is also changed.

17 Claims, 9 Drawing Sheets

$$V_O = (V_1 + V_2 + V_3 + V_4 + V_5 + V_6 + V_7 + V_8 + V_9)/9$$

METHOD AND APPARATUS FOR CONTROLLING A STEREO VIDEO DISPLAY WITH NON-STEREO VIDEO SOURCE

BACKGROUND OF THE INVENTION

1. Field of the Invention

The invention relates to an apparatus and method for controlling a display and, more particularly, to an apparatus and method for controlling a stereo video display with non-stereo video source.

2. Description of the Related Art

The reason why human being has stereoscopic vision is that both human eyes have individual perceptions of the outside world. That is, the left eye sees the scenery on the left; the right eye sees the scenery on the right, and there exists some angle diversities between the two. After a spontaneous fusing process of the brain, it shows stereoscopic scenery in the brain.

Stereoscopic images can be generated by applying a similar principle. By way of showing images for the left eye and the right eye independently, a stereo video display can show different images for each eye of the observer. For example, images for left and right eyes can be alternately played on the display and, in coordination with a synchronized shutter viewer (SSV) such as an LC shutter glasses, the right eye is covered when the display is playing left-eye images, and the left eye is covered when the display is playing right-eye images. That is, the left eye sees only images for the left eye, and the right eye sees only images for the right eye. Continuously repeating the process of displaying images alternately at a speed faster than human vision suspension, the stereo video display enables observers to perceive stereoscopic images.

Referring to FIGS. 1 and 2, a conventional technique for displaying stereoscopic images provides in a memory 1 with two memory blocks B1 and B2 for storing data for sinistral images and data for dextral images. A display 8 shows the sinistral and dextral images stored in the memory blocks B1 and B2 alternately. As shown in FIG. 1, the display 8 shows the sinistral image stored in the memory block B1. As shown in FIG. 2, the display 8 shows the dextral image stored in the memory block B2. When displaying different images, a synchronized shutter viewer (SSV) 9 performs a switching function simultaneously, so that the sinistral image only gets into the observer's left eye, and the dextral image only gets into observer's right eye.

Referring to FIG. 3, when the video source is a non-stereo video source, the stereo video display can make two consecutive frames as a sinistral image and a dextral image, respectively, to display a stereoscopic image. Similar to FIGS. 1 and 2, the memory 1 shown in FIG. 3 also has two memory blocks B1 and B2 as buffers. However, each of the buffers B1 and B2 stores two frames. When showing images stored in the memory block B1, frames F1 and F2 are alternately displayed on the display 8 as the sinistral image and dextral image. When showing images stored in the memory block B2, frames F2 and F3 are alternately displayed on the display 8 as the next sinistral image and dextral image.

Due to little differences existed between two consecutive frames, the stereo video display can provide different image perceptions for each eye of the observer through the above-mentioned method and in coordination with an SSV. When the preparation for the next frame (that is, frame F3) in the memory block B2 is completed, the stereo video display can switch to the memory block B2 and alternately display frames F2 and F3 on the display 8. At the same time, a next frame is being prepared in the memory block B1. By this, stereoscopic images can be played continuously after reading the non-stereo video source.

However, one problem of the above-mentioned method for displaying stereoscopic images is that, when the movement direction of an object in the image is changed, the observer may experience a sudden change in the stereoscopic effect. For example, an object was moving formerly from left to right, and the observer's perception of the object location was at the "front" of the display. When the object changes its moving direction and moves from right to left, the observer will experience a sudden change in the perception of the object location as at the "back" of the display. This problem may result in that the observer is not able to experience a consistent stereoscopic effect, and thus causing confusions to the observer.

SUMMERY OF THE INVENTION

In view of the above problem, the main objective of the invention is to provide an apparatus and method for controlling a stereo video display with non-stereo video source so that the observer is able to experience the stereoscopic effect consistently when watching stereoscopic images.

In order to achieve the above objective, the apparatus for controlling a stereo video display with non-stereo video source of the invention includes a memory, a read/write controller and a motion analyzer. The memory stores a current frame, a previous frame of the current frame, and a next frame of the current frame that is in preparation. The current frame and the previous frame store respectively a dextral image and a sinistral image of a stereoscopic image. The read/write controller controls memory addresses for writing the current and the next frames, as well as the reading order of the current and the previous frames. The motion analyzer calculates a next overall motion direction of the next frame relative to the current frame. The motion analyzer also compares the next overall motion direction with a previous overall motion direction of the current frame relative to the previous frame. This is to control the action of the read/write controller to read from and write into the memory. For this, a corresponding relation between the current and the next frames and the dextral and the sinistral images will be changed as a horizontal relation between the next overall motion direction and the previous overall motion direction is changed.

Besides, the method for controlling a stereo video display with non-stereo video source of the invention includes the following steps. First, a next overall motion direction of a next frame relating to a current frame of the non-stereo video source is calculated. Then, the next overall motion direction is compared with a previous overall motion direction of the current frame relating to its previous frame. According to the result of the comparison, a corresponding relation between the current and the next frames and dextral and sinistral images of a stereoscopic image is determined.

According to one aspect of the invention, the memory can have a first buffer and a second buffer. The first buffer stores the previous frame and the current frame. The second buffer stores the current frame and the next frame. In this case, by changing the addresses for writing the current frame and next frame in the second buffer, the read/write controller changes the corresponding relation between the current and next frames and the dextral and sinistral images.

According to another aspect of the invention, the memory can have a first buffer, a second buffer and a third buffer. The first buffer stores the previous frame. The second buffer stores the current frame. The third buffer stores the next frame. In this case, by changing the reading order of the current frame and the next frame, the read/write controller changes the corresponding relation between the current and next frames and the dextral and sinistral images.

According to the invention, when the motion direction of an object in the image is changed, the corresponding relation between frames and the sinistral and dextral images is also adjusted according to the change of the motion direction. Therefore, the observer is able to experience a stereoscopic effect consistently.

DETAILED DESCRIPTION OF THE PREFERRED EMBODIMENT

Figure 1:
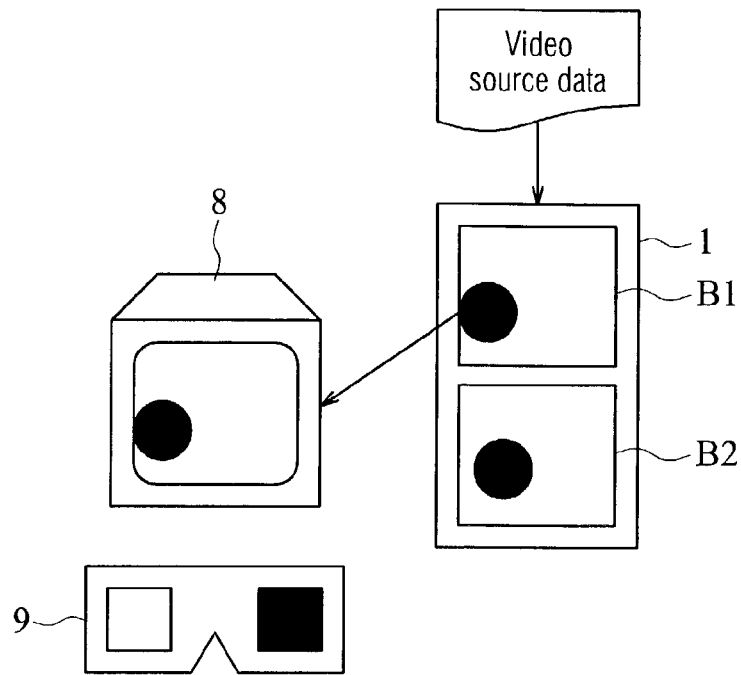
FIGS. 1 and 2 are schematic diagrams illustrating conventional techniques for displaying stereoscopic images.
Figure 2:
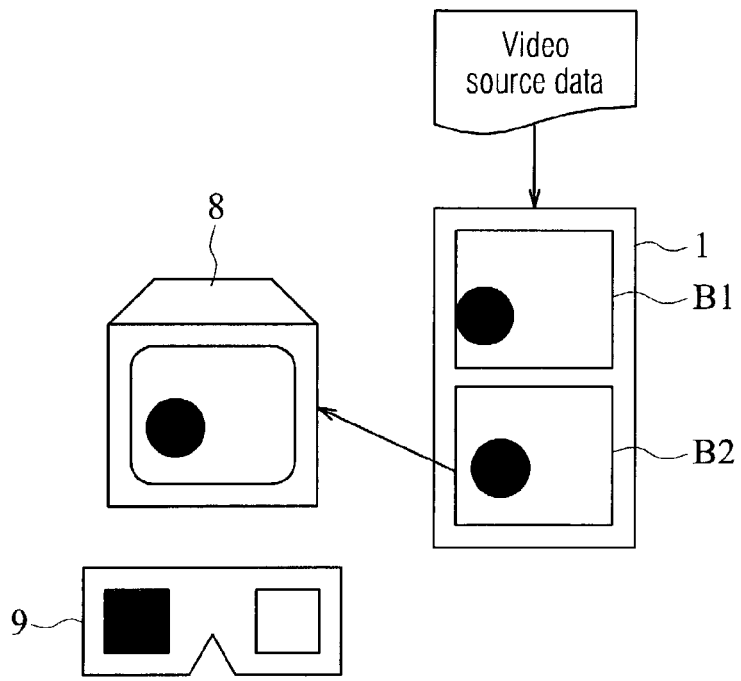
Figure 3:
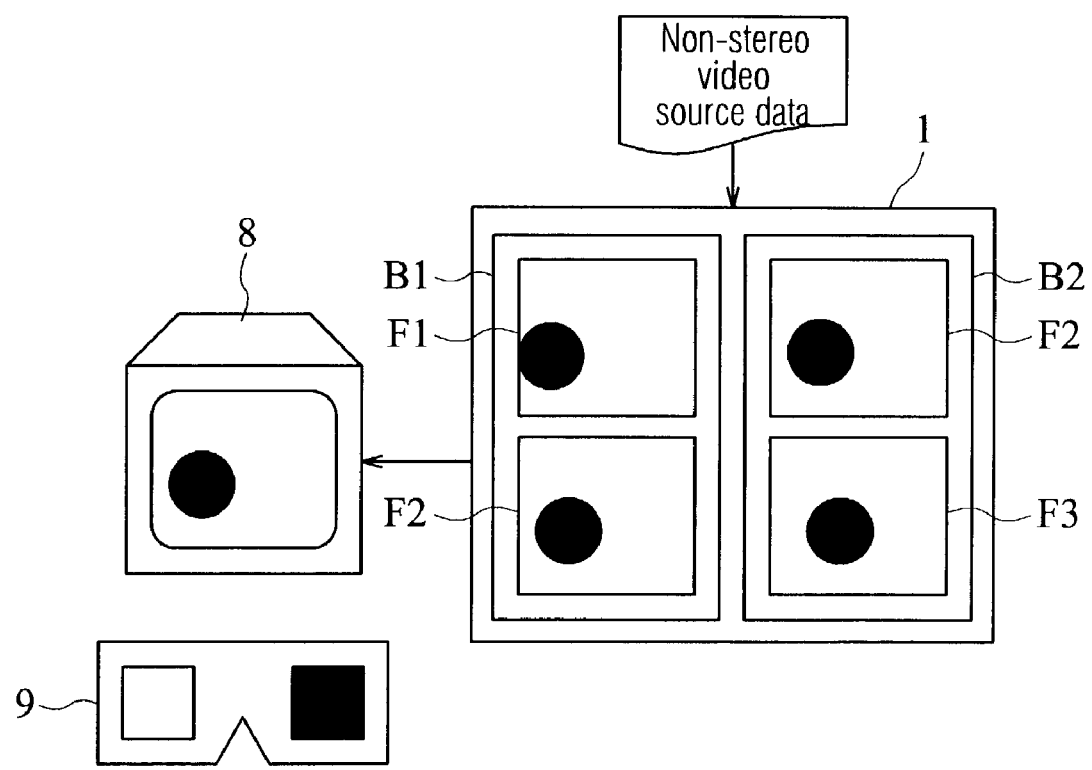
FIG. 3 is a schematic diagram illustrating conventional techniques for displaying stereoscopic images from a non-stereo video source.

With reference to the related drawings, the apparatus and method for controlling a stereo video display with non-stereo video source in accordance with a preferred embodiment of the invention will be more fully described. In the accompanying drawings, like reference numerals designate the same or similar elements.

Figure 4:
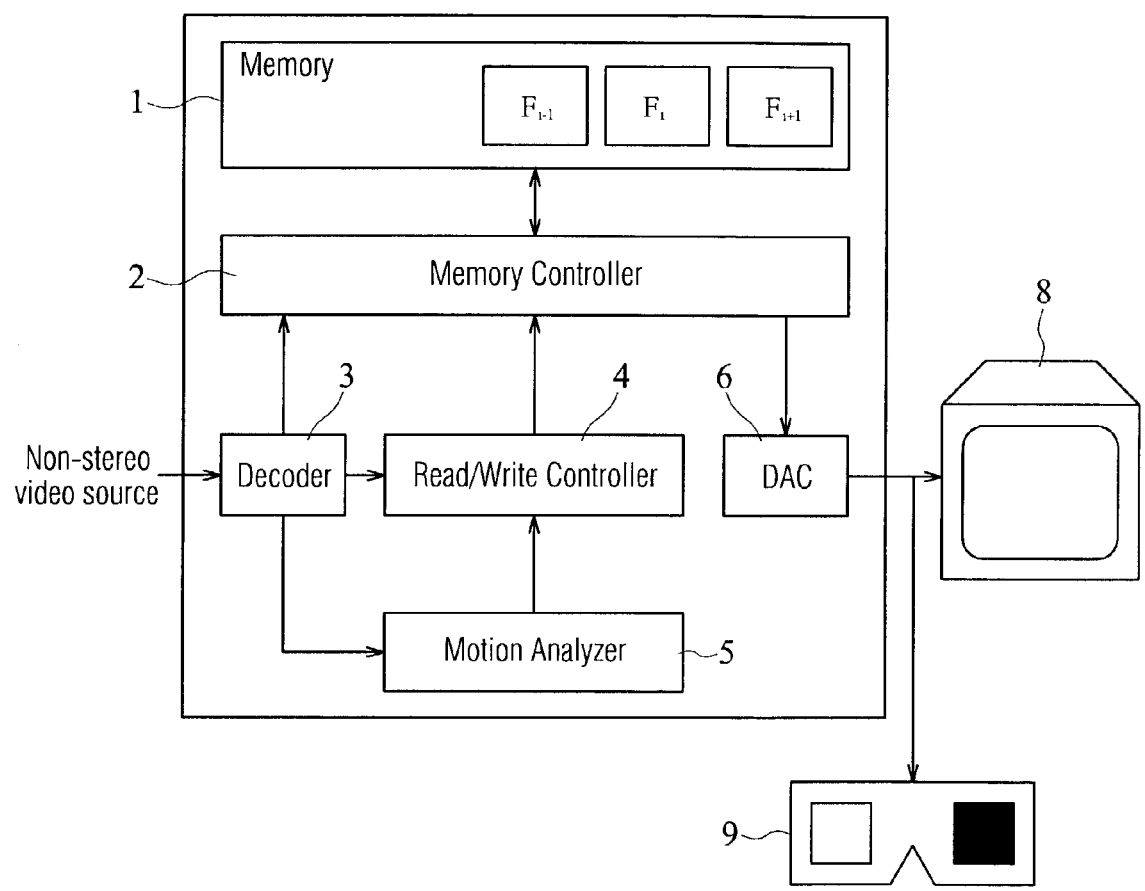
FIG. 4 is a block diagram illustrating the structure of a stereo video display with non-stereo video source in accordance with one embodiment of the invention.

Referring to FIG. 4, the apparatus for controlling a stereo video display of one preferred embodiment of the invention includes a memory 1, a memory controller 2, a decoder 3, a read/write controller 4, a motion analyzer 5 and a digit-to-analog converter (DAC) 6. After reading the non-stereo video source, the apparatus for controlling the stereo video display outputs an analog signal of the stereoscopic image to the display 8, as well as outputs a synchronization signal to a synchronized shutter viewer (SSV) 9.

The memory 1 stores a current frame $F_i$, its previous frame $F_{i-1}$, and its next frame $F_{i+1}$ that is in preparation. The current frame $F_i$ and its previous frame $F_{i-1}$ are both obtained from the decoder 3 by decoding the non-stereo video source. In this embodiment, the above-mentioned non-stereo video source can be a video file of any format. The decoder 3 can decode the video file into a series of frames. For instance, the non-stereo video source can be a video file that complies with the MPEG format. The decoder 3 then can be an MPEG decoder. Those skilled in the art may see their actual need and use hardware chip or software module as the decoder 3.

The memory controller 2 controls data accessing and transferring in the memory 1. It can receive and interpret requests from other elements, confirm the addresses of the data stored in the memory device, in order to read data from the memory device or to write data into the memory device.

The DAC 6 converts the image data stored in the memory from a digital format into an analog format, in order to be output to the display 8. At the same time, the DAC 6 sends a synchronization signal to the SSV 9 to synchronize the action of vertically updating the display 8 with the action of alternating between the left and right of the SSV 9.

Figure 10:
FIG. 10 is a schematic diagram illustrating the calculation method for the overall motion direction in accordance with one embodiment of the invention.

The motion analyzer 5 can be a software module, or a hardware chip or a circuit integrated in a video card or a chip set. The motion analyzer 5 analyzes the corresponding relation between the next frame $F_{i+1}$ and the current frame $F_i$ in order to obtain a next overall motion direction. FIG. 10 shows a video file in an MPEG format as an example. When the decoder 3 decodes the file to obtain each frame, it can derive motion vectors of macroblocks $M_1$ to $M_9$ of each frame relative to macroblocks of a previous frame. Thus, by averaging the motion vectors of each macroblock, we can derive the next overall motion direction $V_0$ of the next frame $F_{i+1}$ relative to the current frame $F_i$. Because process for decoding the MPEG, information about the macroblock and the motion vector are well-known to those skilled in the art and therefore will not be discussed in any further details.

The overall motion direction can be used to determine the approximate motion status for all objects in the current frame $F_i$. Through observing the changes in the horizontal direction of the overall motion direction, the motion analyzer 5 can notify the read/write controller 4 whether to switch the corresponding relation between the current and next frames and the sinistral and dextral images. For instance, if the previous frame is set as a sinistral image of a stereoscopic image and the current frame is set as a dextral image of the stereoscopic image, when the horizontal direction of the previous overall motion direction is to the left, and the horizontal direction of the next overall motion direction is to the left as well, the current frame can be set as the sinistral image of the stereoscopic image and the next frame can be set as the dextral image of the dextral image of the stereoscopic image. Hence, the observer can continuously experience the same stereoscopic effect. On the contrary, if the horizontal direction of the next overall motion direction is to the right, the motion analyzer 5 can then switch the read/write action of the read/write controller 4, so that the current frame is set as a dextral image of the stereoscopic image, and the next frame is set as a sinistral image of the stereoscopic image.

Figure 5:
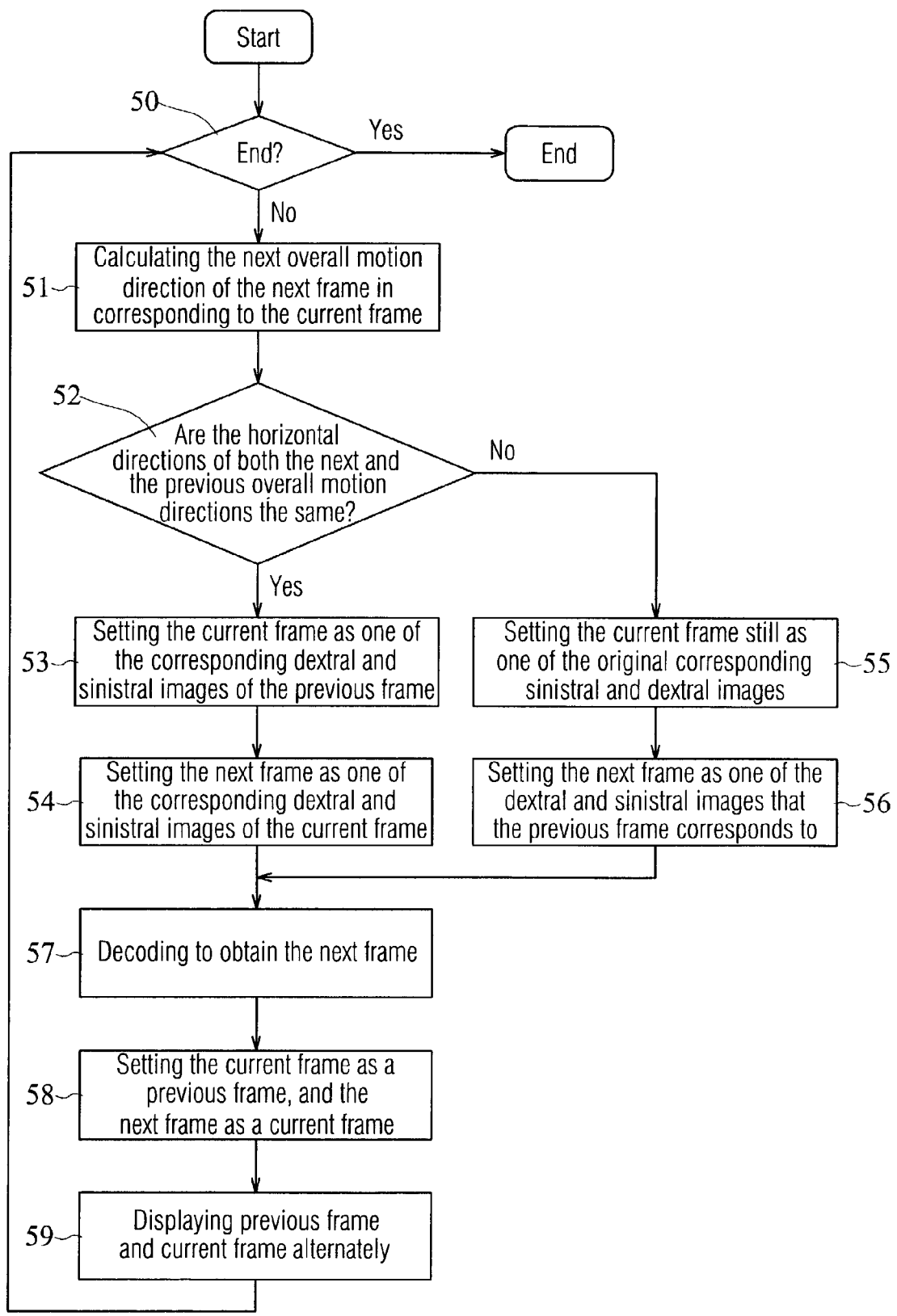
FIG. 5 is a flow chart illustrating the process for controlling the stereo video display with non-stereo video source in accordance with one embodiment of the invention.

Referring to FIG. 5, when reading the non-stereo video source for displaying stereoscopic images, the motion analyzer 5 calculates the next overall motion direction of the next frame relative to the current frame (Step 51) before the decoder 3 decodes and retrieves the next frame. The motion analyzer 5 also compares the next overall motion direction with the previous overall motion direction to see if there are any differences in their horizontal directions (Step 52). If the directions are the same, then the current frame will be set to one of the sinistral and dextral images that the previous frame corresponds to (Step 53). The next frame will also be set to one of the sinistral and dextral images that the current frame corresponds to (Step 54). If the directions are different, then the current frame is still set to one of the sinistral and dextral images that currently corresponds to (Step 55), and set the next frame as one of the sinistral and dextral images that the previous frame corresponds to (Step 56). After the next frame is decoded (Step 57), the current frame is set as a previous frame, and the next frame is set as a current frame (Step 58). Moreover, according to the previous setting, the new previous and current frames are alternately displayed (Step 59). If the process is not yet finished (Step 50), for example, the video file has not yet been played entirely, it continues to process the next frame.

Figure 6:
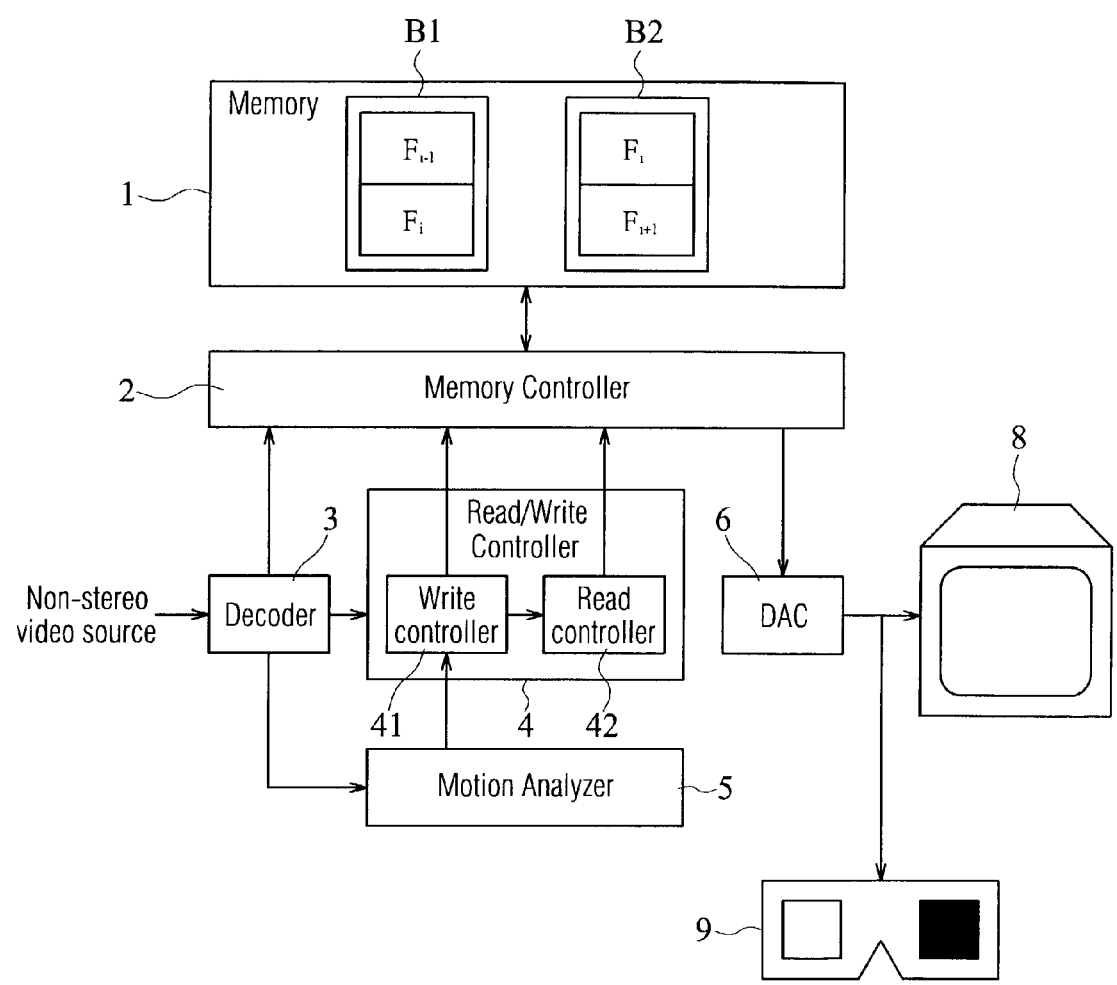
FIG. 6 is a block diagram illustrating the structure of an apparatus for controlling the stereo video display with non-stereo video source in accordance with a first aspect of the preferred embodiment of the invention.
Figure 7A:
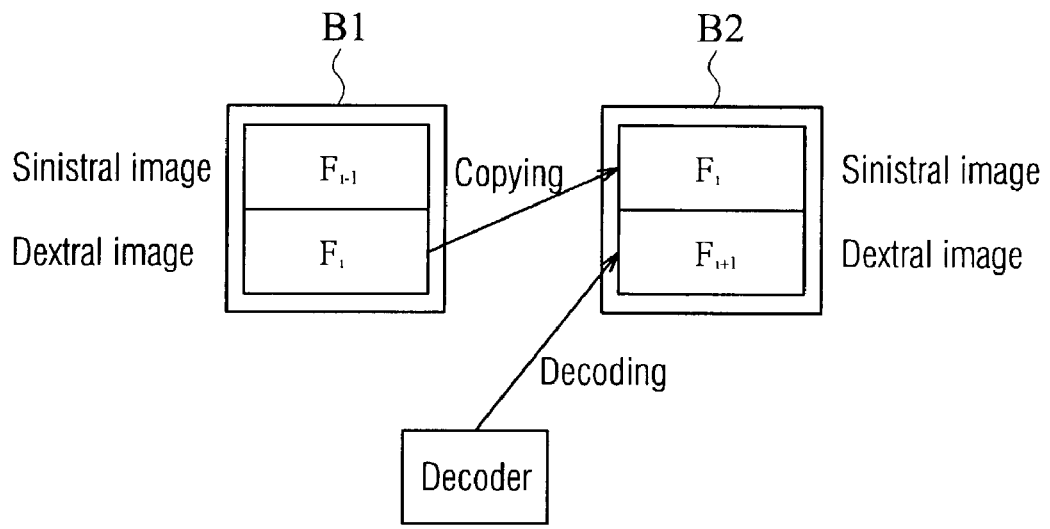
FIGS. 7A and 7B are schematic diagrams illustrating data transferring and writing in the memory in accordance with a first aspect of the preferred embodiment of the invention.
Figure 7B:
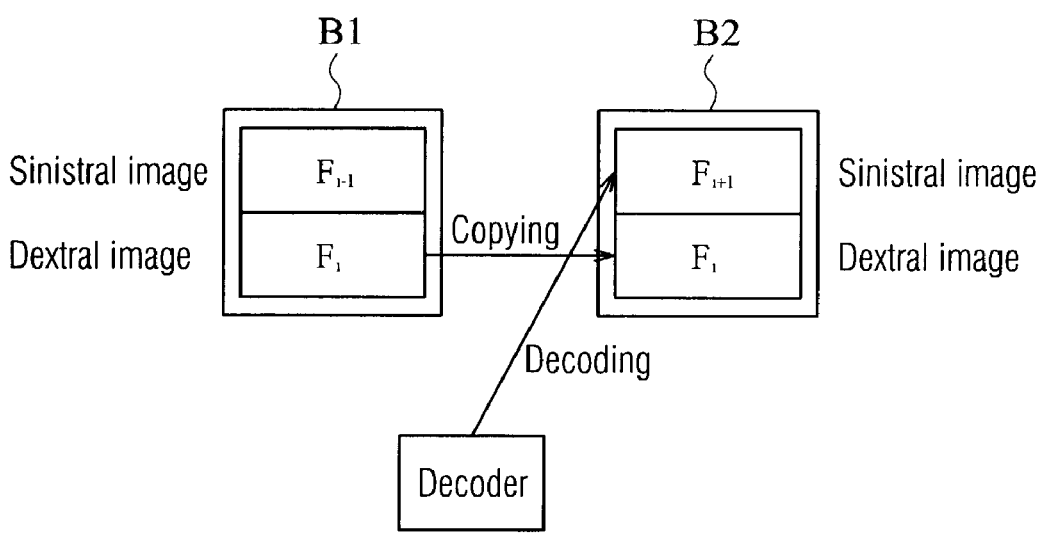
Figure 8:
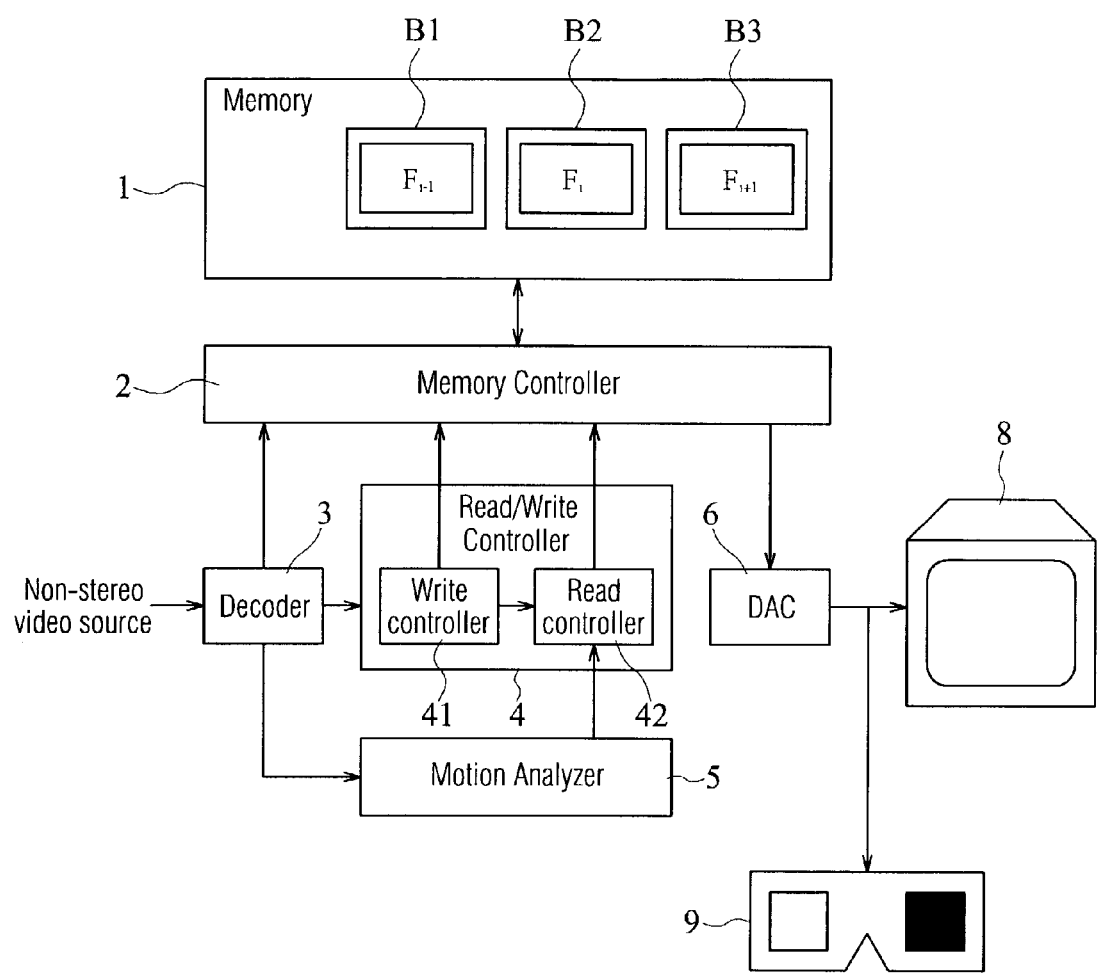
FIG. 8 is a block diagram illustrating the structure of an apparatus for controlling the stereo video display with non-stereo video source in accordance with a second aspect of the preferred embodiment of the invention.
Figure 9A:
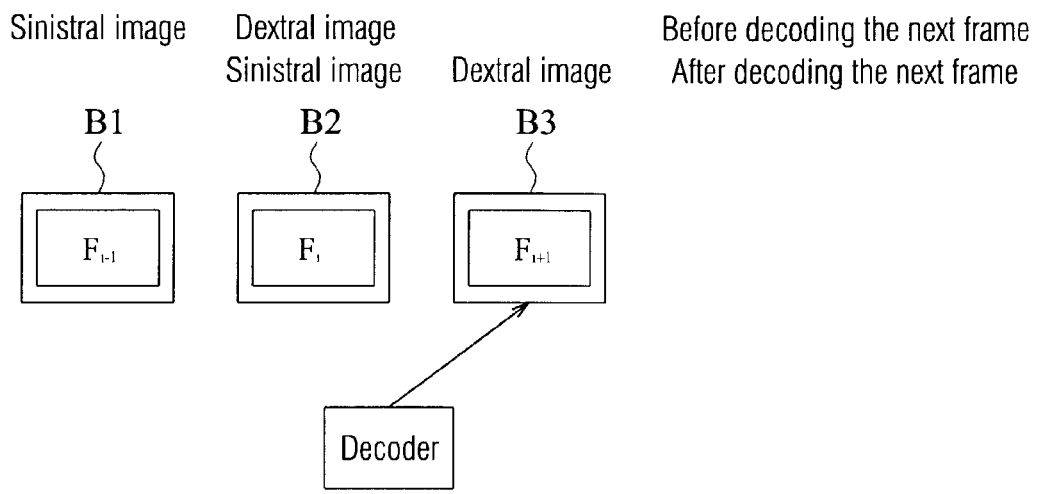
FIGS. 9A and 9B are schematic diagrams illustrating data reading and writing in the memory in accordance with a second aspect of the preferred embodiment of the invention.
Figure 9B:
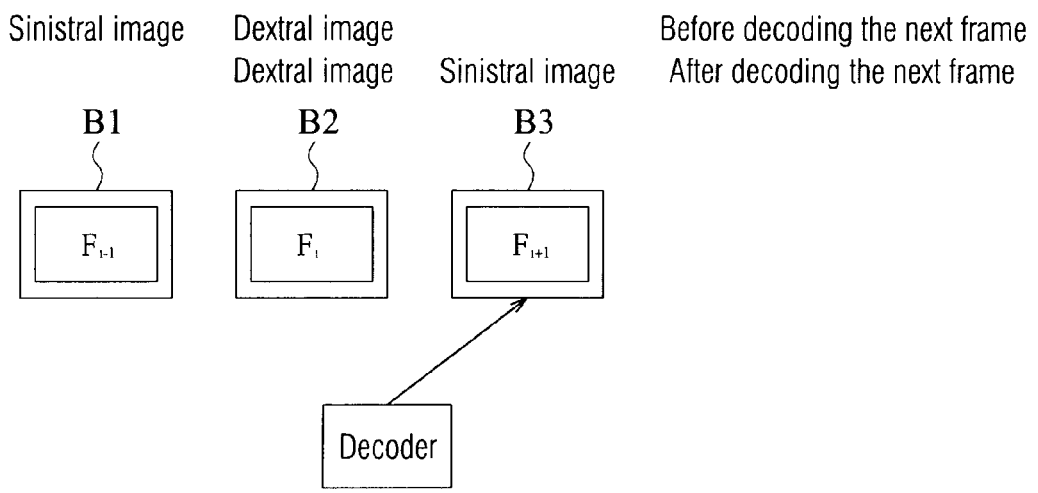

The following descriptions will explain two different aspects for setting the corresponding relation between frames and the sinistral and dextral images. FIGS. 6, 7A and 7B show a first aspect, and FIGS. 8, 9A and 9B show a second aspect.

Referring to FIG. 6, the memory 1 has two buffers B1 and B2. The buffer B1 stores previous frame $F_{i-1}$ and the current frame $F_i$. The buffer B2 stores the current frame $F_i$ and the next frame $F_{i+1}$ of the current frame. The read/write controller 4 has a write controller 41 and a read controller 42. The motion analyzer 5 controls the write controller 41 in the read/write controller 4 in order to change addresses for storing frames in the memory 1.

In the buffer B1 and B2 of the memory 1, data stored in the first half is set to be the sinistral image, and data stored in the second half is set to be the dextral image. Therefore, the read/write controller 4 can change the corresponding relation between frames and the sinistral and dextral images by changing the memory addresses for storing frames in the buffer to be the first half or the second half of the memory.

FIG. 7A illustrates the situation that the horizontal direction of the overall motion direction is not changed. As shown in FIG. 7A, the previous frame $F_{i-1}$ is set as the sinistral image and is stored in the first half of the buffer B1. The current frame $F_i$ is set as the dextral image and is stored in the second half of the buffer B1. Because the horizontal direction for both the next overall motion direction and the previous overall motion direction are the same, the write controller 41 in the read/write controller 4 transfers the current frame $F_i$ to the first half of the buffer B2 and the next frame $F_{i+1}$, after being decoded, is stored in the second half of the buffer B2.

FIG. 7B illustrates the situation that the horizontal direction of the overall motion direction is changed. Because the horizontal directions for the next overall motion direction and the previous overall motion direction are different, the write controller 41 in the read/write controller 4 moves the current frame $F_i$ to the second half of the buffer B2 and the next frame $F_{i+1}$, after being decoded, is stored in the first half of the buffer B2. The observer thus can continuously experience the same stereoscopic effect.

Referring to FIG. 8, in accordance with the second aspect of the invention, the memory 1 has three buffers B1, B2 and B3. The buffer B1 stores the previous frame $F_{i-1}$. The buffer B2 stores the current frame $F_i$. The buffer B3 stores the next frame $F_{i+1}$. Similar to the first aspect, the read/write controller 4 also has a write controller 41 and a read controller 42. The motion analyzer 5 controls the read controller 42 in the read/write controller 4 in order to change the reading order when accessing the frames from the memory 1.

FIG. 9A illustrates the situation that the horizontal direction of the overall motion direction is not changed. As shown in FIG. 9A, the previous frame $F_{i-1}$ is set as the sinistral image and is stored in the buffer B1. The current frame $F_i$ is set as the dextral image and is stored in the buffer B2. Because the horizontal direction for both the next overall motion direction and the previous overall motion direction are the same, after the next frame $F_{i+1}$ is decoded in buffer B3, the read controller 42 in the read/write controller 4 will access the current frame stored in buffer B2 as a sinistral image, and the next frame stored in buffer B3 as a dextral image.

FIG. 9B illustrates the situation that the horizontal direction of the overall motion direction is changed. Because the horizontal directions for the next overall motion direction and the previous overall motion direction are different, after the data in buffer B3 is decoded, the read controller 42 in the read/write controller 4 will access the current frame stored in buffer B2 as a dextral image, and the next frame stored in buffer B3 as a sinistral image. The observer thus can continuously experience the same stereoscopic effect.

According to the invention, when an object in the image changes its motion direction, because the corresponding relation between the frames and the sinistral and dextral images can be adjusted based on the direction change, the observer can experience a consistent stereoscopic effect.

It is apparent to those skilled in the art that various modification and changes can be made without departing from the scope of the invention. For instance, when using two buffers, one can use an interleaved technique or a sync doubling technique in order to reduce the memory usage or to increase the speed for displaying frames.

For this, the foregoing specification is only for illustration rather than limitation. Any modifications and changes made without departing from the spirit and scope of the invention should be included in the appended claims.

What is claimed is:

1. An apparatus for controlling a stereo video display with non-stereo video source, comprising:
    a memory for storing a current frame, a previous frame of the current frame, and a next frame of the current frame that is in preparation, wherein the current frame and the previous frame are for a dextral image and a sinistral image of a stereoscopic image respectively;
    a read/write controller for controlling write-in addresses on the memory for the current frame and the next frame, and reading order of the current frame and the previous frame; and
    a motion analyzer for calculating a next overall motion direction of the next frame in relation to the current frame, and comparing the next overall motion direction to a previous overall motion direction of the current frame in relation to the previous frame, in order to control the action of the read/write controller to read from and write to the memory, so that a corresponding relation between the current and the next frames and the dextral and the sinistral images will be changed when a horizontal relation between the next overall motion direction and the previous overall motion direction is changed.

2. The apparatus of claim 1, further comprising:
    a decoder for generating the previous frame, the current frame, and the next frame from the non-stereo video source.

3. The apparatus of claim 1, wherein the memory has a first buffer and a second buffer, the first buffer stores the previous frame and the current frame, and the second buffer stores the current frame and the next frame.

4. The apparatus of claim 3, wherein the read/write controller changes the corresponding relation between the current and the next frames and the dextral and the sinistral images by changing the write-in addresses on the second buffer for the current frame and the next frame.

5. The apparatus of claim 1, wherein the memory have a first buffer, a second buffer and a third buffer, the first buffer stores the previous frame, the second buffer stores the current frame, and the third buffer stores the next frame.

6. The apparatus of claim 5, wherein the read/write controller changes the corresponding relation between the current and the next frames and the dextral and the sinistral images by changing the reading order for the current frame and the next frame.

7. The apparatus of claim 1, wherein the non-stereo video source is an MPEG format video file, and the motion analyzer averages motion vectors of each macroblock in the next frame to obtain the next overall motion direction.

8. A method for controlling a stereo video display with non-stereo video source, comprising the steps of:
    calculating, in relation to a current frame of the non-stereo video source, a next overall motion direction of a next frame of the current frame;
    comparing the next overall motion direction with a previous overall motion direction of a previous frame of the current frame; and
    according to a result of the comparing step, determining a corresponding relation between the current and the next frames and dextral and sinistral images of a stereoscopic image, wherein the step of determining the corresponding relation is carried out by changing addresses to write the current frame and the next frame into the memory.

9. The method of claim 8, wherein the step of determining the corresponding relation is carried out by changing reading order of the current frame and the next frame from the memory.

10. The method of claim 8, further comprising the steps of:
    decoding, in order to obtain the next frame; and
    setting the current frame as a previous frame, and setting the next frame as a current frame.

11. The method of claim 8, wherein the non-stereo video source is an MPEG format video file, and the step of calculating is carried out by averaging motion vectors of each macroblock in the next frame.

12. A computer system comprising:
    a decoder for generating, from the non-stereo video source, a current frame, a previous frame of the current frame, and a next frame of the current frame that is in preparation, the current frame and the previous frame are for a dextral image and a sinistral image of a stereoscopic image respectively;
    a memory for storing the current frame, the previous frame and the next frame;
    a memory controller for controlling data accessing and transferring in the memory;
    a read/write controller for controlling addresses to write the current frame and the next frame in the memory, and reading order of the current frame and the previous frame; and
    a motion analyzer for calculating an overall motion direction of the next frame in relation to the current frame, and comparing the next overall motion direction with a previous overall motion direction of the current frame relative to the previous frame, in order to control the read/write controller to read from or write into the memory, so that a corresponding relation between the current and the next frames and the dextral and the sinistral images is changed when a horizontal relation between the next overall motion direction and the previous overall motion direction is changed.

13. The computer system of claim 12, wherein the memory has a first buffer and a second buffer, the first buffer stores the previous frame and the current frame, and the second buffer stores the current frame and the next frame.

14. The computer system of claim 13, wherein the read/write controller changes the corresponding relation between the current frame and the next frame and the dextral image and the sinistral image by changing the addresses to write the current frame and the next frame into the second buffer.

15. The computer system of claim 12, wherein the memory have a first buffer, a second buffer and a third buffer, the first buffer stores the previous frame, the second buffer stores the current frame, and the third buffer stores the next frame.

16. The computer system of claim 15, wherein the read/write controller changes the corresponding relation between the current and the next frames and the dextral and the sinistral images by changing the reading order of the current frame and the next frame.

17. The computer system of claim 12, wherein the non-stereo video source is an MPEG format video file, and the action analyzer averages motion vectors of each macroblock in the next frame to obtain the next overall motion direction.

* * * * *